2,808,375

PHENOL REMOVAL FROM PHENOL-CONTAMINATED WASTE WATERS

Dan P. Manka, Pittsburgh, Pa., assignor to Jones & Laughlin Steel Corporation, Pittsburgh, Pa., a corporation of Pennsylvania No Drawing. Application May 10, 1954, Serial No. 428,837

5 Claims. (Cl. 210—21)

This invention relates to the purification of phenol-contaminated waste waters and is particularly concerned with the purification of waste waters from by-product coke plants and the like.

Waste waters dicharged from plants engaged in the by-product coking of coal contain phenol compounds which are objectionable even when present in minute amounts in water which is to be purified for drinking purposes. Such purification treatment usually includes chlorination, and the above-mentioned phenol compounds when chlorinated impart an offensive taste and odor to the water. It is therefore desirable to remove substantially all phenol compounds from coke plant waste waters before these waters are discharged into natural water courses. The reduction of phenol compounds to a tolerable limit, which is on the order of a few parts per million, is, however, very difficult to bring about on a commercial scale.

It is an object of my invention, therefore, to provide a process which reduces the phenol content of waste waters to a tolerable minimum. It is another object to provide such a process which can be carried out commercially at a reasonable cost. Other objects will appear in the course of the following description of my invention.

It is known that phenol compounds can be extracted from waste waters by the use of reagents which are solvents for the phenols but are themselves substantially insoluble in water. Aromatic hydrocarbons constitute one class of such solvents. Toluene in particular is quite generally used for this purpose because of its low solubility in water. At by-product coke plants the so-called light oil cut which contains benzene, toluene, and xylene is commonly used. A typical light oil is composed as follows:

| | Percent |
|---|---|
| Benzene | 65–75 |
| Toluene | 15–25 |
| Xylene | 3–10 |

A single stage of extraction with toluene, however, removes only about 53% of the phenols in the waste waters. Five stages of conventional extraction with toluene are generally required to lower the phenol content of waste waters to a tolerable level. Such a process, of course, is relatively costly to install and carry on. I have found that the solubility of phenols in toluene and other aromatic hydrocarbon phenol solvents can be greatly increased if a small amount of dehydroabietylamine is added to the solvent. A three-stage extraction of phenol-contaminated waste waters with a solvent containing such additive can reduce the phenol content of the water to below two parts per million.

Dehydroabietylamine, which is a rosin porduct, is an amber, viscous liquid soluble in aromatic hydrocarbons, but essentially insoluble in water. Its density at 25° C. is 8.34 pounds per gallon, and its boiling point at 760 mm. of mercury is 344.0° C. I find that the addition to an aromatic hydrocarbon solvent of a small amount of this reagent, preferably between about 1% and 2% by volume, greatly increases the ability of the solvent to extract phenols from waste phenol-containing water.

A present preferred embodiment of my process will now be described with reference to the treatment with a toluene solvent of waste waters from a by-product coke plant. This process employs three stages of extraction. I prefer, first, to remove oil and solids in the phenol-contaminated waste water by settling, and I also prefer to bring the pH value of the water within the range of about 6.5 to about 9.5. This pH adjustment can be made by the addition of dilute sulfuric acid. If strong bases are present in the waste water, they may convert some of the phenols into phenolates which are insoluble in solvents for phenol. If the waste water is too acid, some of the dehydroabietylamine may be converted into water soluble salts.

The waste water comes from the plant at a temperature between about 50° C. and about 65° C., and this temperature range is satisfactory for the operation of my process. The phenol-contaminated waste water is introduced into the first stage of my process and there mixed with solvent flowing from the second stage. It will be understood that each stage of my process may be carried out in apparatus conventionally employed for solvent extraction. Those skilled in the art are aware that each extraction stage requires that contact between the waste water and the solvent be sufficiently intimate and maintained for a sufficient period of time to permit distribution equilibrium to be established, so that raffinate and extract are equilibrium solutions. When these conditions are attained, the two liquids are allowed to separate by gravity, the solvent settling above the water. The settled water from the bottom of the first stage is introduced into the second stage where it is mixed with solvent flowing from the third stage. The settled water from the second stage is introduced into the third stage and mixed with solvent from regenerators to be described. The water that settles in the third stage is quite low in phenol content, but includes a certain amount of solvent entrained therein. I find it desirable to remove entrained solvent from this water by bubbling through the water a non-oxidizing gas, such as nitrogen or coke oven gas. Coke oven gas, of course, is readily available at a by-product coke plant, and such gas or nitrogen together with the solvent it has removed from the waste water can be returned to the coke oven gas stream ahead of the primary coolers or the ammonia saturators. The waste water, after treatment with gas as above described, is then discharged to the sewer.

A neutral waste water containing 444 parts per million of phenol compounds was treated by my process as described above with an equal volume of toluene containing 1% by volume of dehydroabietylamine, and the treated waste water was found to have a phenol content of only 9.1 parts per million. When similar waste water was treated with an equal volume of toluene containing 2% by volume of the additive, the effluent contained 3.8 parts per million of phenol. Neutral waste water containing 278 parts per million of phenol, when treated with an equal volume of toluene containing 1.75% of dehydroabietylamine, showed a phenol content of only 1.7 parts per million. I have likewise treated weak ammonia liquor coming from a by-product coke plant. This liquor contained 2460 parts per million of phenol, but after treatment with light oil containing 1% of the rosin amine above mentioned, displayed a phenol content of 17.6 parts per million. The phenol concentration of the effluent was reduced to 10 parts per million when the solvent contained 2% of the dehydroabietylamine additive.

It is economically desirable to regenerate and reuse the phenol-bearing solvent removed from the third stage of my process. This may be accomplished by introducing such solvent into the bottom of a column filled with fine glass wool or some similar packing material. As the solvent flows up through the wool, the entrained water coalesces and separates from it. The clear solvent from the top of the column is introduced into a layer of 6% aqueous solution of sodium hydroxide in the bottom of a first regenerator vessel, where a large portion of the phenols are recovered from the solvent as sodium phenolate. The solvent partially freed from phenol settles above the caustic soda solution and is pumped into a second regenerator vessel similar to the first and containing the same sodium hydroxide solution. The solvent settling out from this vessel contains less than 50 parts per million of phenol. This regenerated solvent is then caused to flow through a layer of glass wool or similar material in a settling tank for the removal of entrained alkali. The solvent from this tank is pumped into the third extraction stage of my process, as has been mentioned.

Dehydroabietylamine may be used in amounts greater than 2% by volume with advantageous results as far as phenol removal is concerned. I have extracted in a single stage phenols from neutral waste water containing 266 parts per million of phenols, utilizing an equal volume of toluene containing dehydroabietylamine in amounts varying from 1% to 4% with the results listed in Table I below.

Table I

| Dehydroabietylamine Content of Solvent by Volume, percent | Phenol Content of Treated Waste Water, p. p. m. |
| --- | --- |
| 1 | 44 |
| 2 | 26 |
| 3 | 22 |
| 4 | 17.9 |

These results show that the effectiveness of the dehydroabietylamine additive with respect to phenol extraction does not decrease as the amount of this additive is increased to at least 4% by volume of the toluene solvent. However, the viscous nature of dehydroabietylamine renders hydrocarbon phenol solvents containing more than 4% of the additive somewhat difficult to handle. I also find that phenol-containing hydrocarbon solvents containing as much as 4% of the additive are rather troublesome to regenerate because of their viscosity. It is difficult to remove entrained alkali from regenerated solvents of this composition by the described step of passing the solvent through glass wool in a settling tank.

I claim:

1. The process of removing phenols from phenol-contaminated waste waters comprising treating said waters with a mixture of an aromatic hydrocarbon solvent for phenols and dehydroabietylamine, whereby phenols are dissolved in said solvent, and separating said mixture from the waste waters.

2. The process of claim 1 in which the volume of the waste waters and the volume of the aromatic hydrocarbon solvent are about equal.

3. The process of claim 1 in which the volume of the dehydroabietylamine is between about 1% and 4% of the volume of the aromatic hydrocarbon solvent.

4. The process of removing phenols from phenol-contaminated waste waters comprising adjusting the pH of said waste waters to a value in the range from about 6.5 to about 9.5, bringing said waste waters into intimate contact with a substantially equal volume of an aromatic hydrocarbon solvent for phenols containing between about 1% and about 2% by volume of dehydroabietylamine, whereby said phenols are dissolved in said solvent, and separating said phenol-bearing solvent from the waste waters.

5. The process of removing phenols from phenol-contaminated waste waters comprising adjusting the pH of said waste waters to a value in the range from about 6.5 to about 9.5, bringing said waste waters into intimate contact with a mixture of an aromatic hydrocarbon solvent for phenols and dehydroabietylamine, whereby phenols are dissolved in said solvent, and separating said mixture from the waste waters.

References Cited in the file of this patent

UNITED STATES PATENTS

| 1,795,382 | Ulrich | Mar. 10, 1931 |
| 1,830,725 | Ulrich | Nov. 3, 1931 |
| 2,043,102 | Kester | June 2, 1936 |